(12) United States Patent
Matichuk

(10) Patent No.: US 9,009,738 B2
(45) Date of Patent: Apr. 14, 2015

(54) DEVICE IDENTIFICATION USING DEVICE FUNCTIONS

(75) Inventor: Chris Ernest Matichuk, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 13/050,543

(22) Filed: Mar. 17, 2011

(65) Prior Publication Data

US 2012/0239800 A1 Sep. 20, 2012

(51) Int. Cl.
G06F 9/44 (2006.01)
H04L 12/24 (2006.01)
G06F 7/04 (2006.01)
G06F 15/16 (2006.01)

(52) U.S. Cl.
CPC ........ *H04L 41/0853* (2013.01); *H04L 41/0809* (2013.01)

(58) Field of Classification Search
None
See application file for complete search history.

(56) References Cited

U.S. PATENT DOCUMENTS

| 7,506,048 B1 * | 3/2009 | Motoyama .................... 709/224 |
| 2002/0112176 A1 | 8/2002 | Murray |
| 2005/0076386 A1 * | 4/2005 | Carter et al. .................. 725/111 |
| 2005/0223386 A1 | 10/2005 | Suthapong |
| 2006/0064761 A1 * | 3/2006 | Multerer et al. ................ 726/27 |
| 2008/0237343 A1 | 10/2008 | Muraki |
| 2009/0110295 A1 | 4/2009 | Ogaki et al. |
| 2009/0158301 A1 | 6/2009 | Holan et al. |
| 2010/0241660 A1 | 9/2010 | Bhorania et al. |

OTHER PUBLICATIONS

"How to Create a Device Metadata Package for Devices and Printers", Retrieved at << http://download.microsoft.com/download/9/C/5/9C5B2167-8017-4BAE-9FDE-D599BAC8184A/CreateDevMetadataPkg.docx >>, Oct. 28, 2010, p. 1-54.
Brodeur, et al., "PCs and Devices in Windows 7: What You Need to Know", Retrieved at << http://download.microsoft.com/download/d/1/d/d1dd7745-426b-4cc3-a269-abbbe427c0ef/sys-t752_ddc08.pptx >>, 2008, pp. 37.
"PNP-X Implementer's Guide", Retrieved at << http://download.microsoft.com/download/5/D/6/5D6EAF2B-7DDF-476B-93DC-7CF0072878E6/PnP-X_imp.doc >>, Apr. 19, 2005, p. 1-17.
Sikander, Javed., "Microsoft RFID Technology Overview", Retrieved at << http://msdn.microsoft.com/en-us/library/aa479362.aspx >>, Nov. 2004, pp. 24.

* cited by examiner

*Primary Examiner* — Wei-Tai Lin
(74) *Attorney, Agent, or Firm* — Timothy Churna; Kate Drakos; Micky Minhas

(57) ABSTRACT

Device identification techniques using identifiable device functions are described. In one or more implementations, data is obtained that describes functions of a device that are identifiable for use in conjunction with a computing device and a device identifier (ID) is computed for the peripheral device based on the identifiable device functions.

20 Claims, 5 Drawing Sheets

400

402
Obtain data that describe functions of a device that are identifiable for use in conjunction with a computing device

404
Compute a device identifier for the device based on the device functions

DEVICE IDENTIFICATION USING DEVICE FUNCTIONS

BACKGROUND

The variety of devices that may be employed by computing devices is ever increasing. For example, a computing device may employ devices configured for storage, printing, scanning, wireless communication, voice input, image capture, and so on to add a multitude of different functionality to the computing device.

Traditional techniques that were used to gather telemetry data about the computing devices, however, typically did not identify the devices that were associated with the computing device. Therefore, it could be difficult to determine "how" and "where" functionality of the computing device was achieved. This further complicated processing of the telemetry data, such as compatibility analysis to determine issues that may occur between the computing device and the devices connected to it.

SUMMARY

Device identification techniques using device functions are described. In one or more implementations, data is obtained that describes functions of a device that are identifiable for use in conjunction with a computing device and a device identifier (ID) is computed for the device based on the device functions.

In one or more implementations, telemetry data is collected from a plurality of computing devices via a network, the data describing device functions for use in conjunction with a respective computing device. One or more combinations of the device functions are identified as corresponding to a device.

In one or more implementations, telemetry data is collected from a plurality of computing devices via a network, the data describing device functions for use in conjunction with a respective computing device. Models of devices are identified from the collected telemetry data based at least in part on combinations of the functions and the collected telemetry data is analyzed as corresponding to respective devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

A variety of different devices may be employed by a computing device, such as peripheral devices, virtual devices (e.g., a "print to" device implemented using software), and so on. Traditional techniques that were employed to collect telemetry data about the computing device, however, did not identify devices that were connected to and/or implemented by the computing device. This may make it difficult to process the telemetry data, which may be performed for a variety of purposes such as for compatibility analysis, to compute metrics, test prioritization, customer messaging, and so on.

Techniques for device identification using device functions are described. In one or more implementations, a device is identified based on which device functions that are identifiable for use by a computing device. A flash drive, for instance, may be recognized by a computing device as a USB mass storage device, as a portable device, and as a disk drive. One or more of these functions may have unique identifiers, such as to identify particular drivers and other software that are employed to enable communication between the device and a computing device to which it is communicatively coupled. The combination of the functions may be used to generate a hash which may be used to identify the device, itself. In this way, the device functions may be leveraged to identify the device without specially encoding a dedicated identifier in hardware of the device. Further discussion of device identification techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
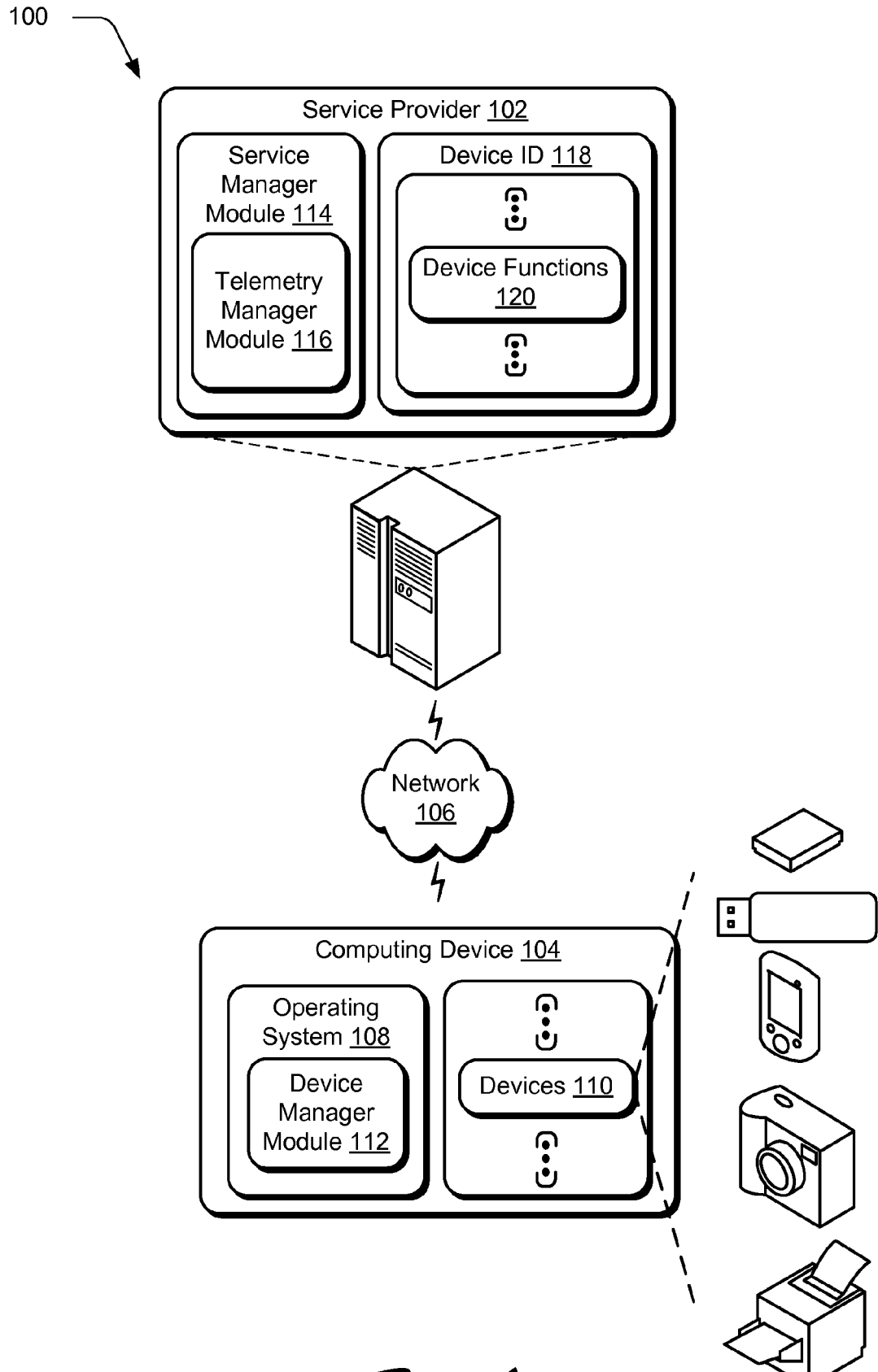
FIG. 1 is an illustration of an environment in an example implementation that is operable to employ device identification techniques.

FIG. 1 is an illustration of an environment 100 in an example implementation that is operable to employ techniques described herein. The illustrated environment 100 includes a service provider 102 and a computing device 104 that are communicatively coupled via a network 106. The computing device 104 and the service provider 102 may be implemented by a variety of different configurations of computing devices.

For example, a computing device may be configured as a computer that is capable of communicating over the network 106, such as a desktop computer, a mobile station, an entertainment appliance, a set-top box communicatively coupled to a display device, a wireless phone, tablet, a game console, and so forth. Thus, a computing device may range from full resource devices with substantial memory and processor resources (e.g., personal computers, game consoles) to a low-resource device with limited memory and/or processing resources (e.g., traditional set-top boxes, hand-held game consoles). Additionally, a computing device may be representative of a plurality of different devices, such as multiple servers utilized by a business to perform operations, support a platform "in the cloud" and thus the computing device implements at least part of platform of a cloud computing system, and so on.

A computing device may also include an entity (e.g., software) that causes hardware of the computing device to perform operations, e.g., processors, functional blocks, and so on. For example, the computing device may include a computer-readable medium that may be configured to maintain instructions that cause the computing device, and more particularly hardware of the computing device to perform operations. Thus, the instructions function to configure the hardware to perform the operations and in this way result in transformation of the hardware to perform functions. The instructions may be provided by the computer-readable medium to the computing device through a variety of different configurations.

One such configuration of a computer-readable medium is signal bearing medium and thus is configured to transmit the instructions (e.g., as a carrier wave) to the hardware of the computing device, such as via the network 106. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The computing device 104 is illustrated as including an operating system 108. The operating system 108 is configured to abstract functionality of underlying hardware of the computing device 104 (e.g., processors, functional blocks, and memory) to applications and other software that is executed on the computing device 104.

Part of this abstraction may include devices 110 that are communicatively coupled to the computing device 104 via a physical connection, such as a bus (e.g., PCI, USB), network connection (e.g., Ethernet, WUSB, Bluetooth), SoC supported bus, and so forth. For example, the devices 110 may be configured in a variety of ways, such as an external disk drive, flash drive, portable music device, digital camera, and printer as illustrated as well as a variety of other ways. The devices 110, for instance, may be configured as peripheral devices that may be configured for external or internal use by the computing device 104 through connection to a bus of the computing device, e.g., a USB bus, PCI bus, and so on. The devices 110 may also be representative of virtual devices that may be employed by the computing device 104. For example, the device 110 may be configured as a virtual printer such that the software is represented and recognized by the computing device 104 as if it was an actual physical device. A variety of other examples are also contemplated.

To manage interaction with the device 110, the operating system 108 is illustrated as including a device manager module 112. The device manager module 112, for instance, may configure software (e.g., drivers) of the computing device 104 to communicate with the devices 110. Although illustrated as part of the operating system 108, the device manager module 112 may be implemented in a variety of other ways, such as a standalone module that is implemented local to or remote from the computing device 104.

The device manager module 112 may also collect data that describes interaction with the device 110. For example, the data may describe functions that are enabled for use by the computing device 104 through drivers and so on. In one or more implementations, the functions themselves are uniquely identified (e.g., using a function ID) such that the device manager module 112 may install the device 110 using information that is local to the computing device 104, remotely over a network (e.g., to obtain a driver from a network service), and so on. This data may then be communicated by the computing device 104 via the network 106 to the service provider 102.

The service provider 102 is illustrated as including a service manager module 114. The service manager module 114 is representative of functionality of the service provider 102 to provide services via the network 106. One such service is illustrated as being provided using a telemetry manager module 116. The telemetry manager module 116 is representative of functionality of the service provider 102 to collect and/or process telemetry data received from one or more computing devices 102. For example, the telemetry manager module may process the telemetry data to perform a compatibility analysis, generate one or more metrics, prioritize tests, for customer messaging, and so on.

One technique that may be used to aide this processing is a device identifier (ID) 118 that is generated based on device functions 120. For example, the device ID 118 may be formed based on a combination and identification of the device functions 120. In this way, the telemetry data may be processed in a manner such that particular devices (e.g., particular product models) may be identified and compared across a customer base even if the devices do not include a hardware ID implemented in hardware of the device 110, further discussion of which may be found in relation to the following figure.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

Figure 2:
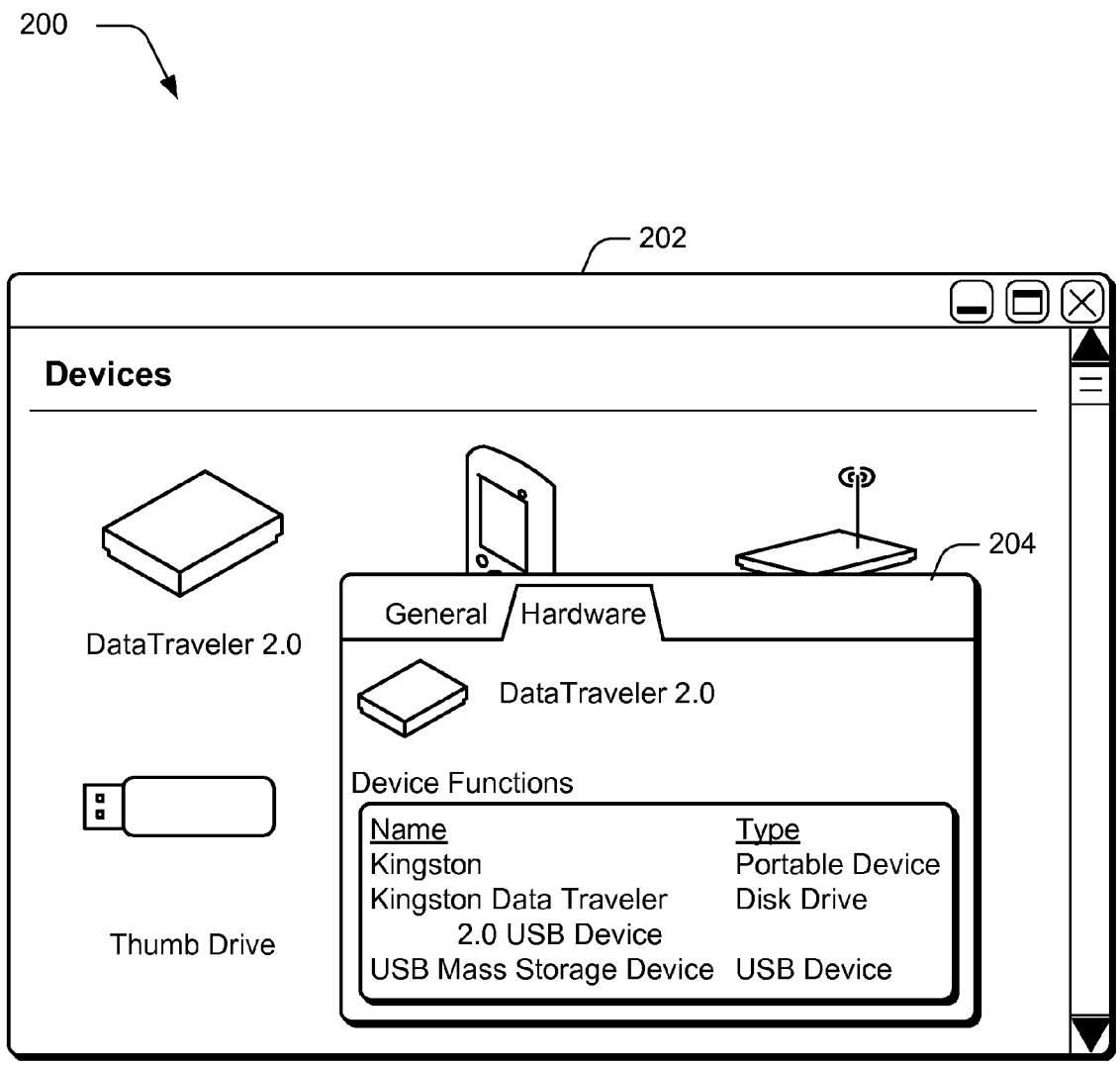
FIG. 2 is an illustration of a system in an example implementation showing an example user interface as output that includes descriptions of functions of a single device as recognized by a computing device.

FIG. 2 is an illustration of a system 200 in an example implementation showing an example user interface 202 as output that includes descriptions of functions of a single device as recognized by a computing device 104. As previously described, a device 110 may be configured in a variety of ways, such as an embedded peripheral, external tethered peripheral, external networked peripheral, machines including embedded peripherals, virtual device, and machines excluding embedded peripherals.

In this implementation example, a container ID feature for "Devices and Printers" of the operating system 108 is leveraged to identify which functions belong to which device, e.g., hardware product. A container ID may be used to represent an instance of a device installed for communication with the computing device 104 and may be included in the properties of each function of the device 110.

In an implementation, a container ID identifies removable peripherals (e.g., external to the computing device 104) but does not identify internal peripherals, e.g., graphics cards. Therefore, a sub-container ID may also be used to identify the device functions for internal peripherals. Accordingly, for purposes of the following discussion a container ID may be used to reference both internal and external peripherals.

The device identifier 118 is implemented in this example as a hash computed accordingly to the following expression:

Hash(Sort(Function_ID of each function for the device 110)).

For devices 110 that have implemented a unique ModelId product identifier in hardware of the device 110, the ModelId may also be included in an expression as follows:

Hash(ModelId+Sort(Function_ID of each function for the device 110.

A device ID 118 for an external peripheral may be referenced as "DeviceModelId" in the following discussion. The identifier for the computing device 104 (e.g., embedded functions and internal peripherals) may be referenced as "MachineModelId."

The device manager module 112 of the operating system 108 may collect MachineModelId, DeviceModelId, ModelId, Hash(ContainerId), and several other properties (e.g., which may be referenced as strings) for each function in the computing device 104. This data may then be reported to the service provider 102 via the network 106 for processing by the telemetry manager module 116, such as hardware product level compatibility statements, test prioritization, popularity metrics, and so on as previously described. Combinations of MachineID, MachineModelId, DeviceModelId, and HardwareId may be used to correlate telemetry data for particular devices between several data sources.

In some cases, each of the possible device functions 120 may not be readily identifiable on the computing device 104, such as in instances in which the device functions 120 are not enabled. In such an instance, the service provider 102 may determine the device functions 120 by looking at each of the DeviceModelIds that reference the same subset of device functions, where the DeviceModelId that references the most device functions is the "parent" of the others, the following shows such an example:

$D\_ID1 = F\_ID1$ $D\_ID2 = F\_ID1 + F\_ID2$ $D\_ID3 = F\_ID1 + F\_ID2 + F\_ID3$ $D\_ID4 = F\_ID1 + F\_ID3$

In this example, each of the above refer to the same retail product, where the first two simply have one or more device functions disabled. Both pieces of information (association and enabled/disabled) may be used Accordingly, a device ID 118 (e.g., DeviceModelId or MachineModelId) may be computed according to the following expression:

Device ID 118=Hash(ModelId+Sort(Function_ID of each device function referenced by the same ContainerId))

Generally, a Function_ID is unique among each of the devices made by a vendor, and may include a vendor-specific vendor ID. As such, a device 110 may be referenced using one of the Function_IDs for one of the device functions. To identify the functions associated with the device 110, a container may use a "removable" property. In an implementation, the hash is computed such that a determination is not made as to which of the functions is to be used as a "primary" function.

Given that it is possible for instances of a device 110 to have different combinations of identifiable device functions, it is possible that a single device 110 may be represented using multiple device IDs 118 (e.g., DeviceModelIds). In other words, each device ID 118 for the single device 110 may represent a specific combination of identifiable device functions for the device 118. For instance, a multiprotocol (e.g., device profile for web service and universal plug-n-play) device 110 may be represented by multiple device IDs 118, e.g., DeviceModelIds. The ModelId may be included in the hash to accommodate hardware products that implement ModelId in hardware of the device 110 but do not have unique device function IDs.

The user interface 202 as illustrated includes representations (e.g., icons) of devices 110 that are communicatively coupled to the computing device 104. This user interface 202 is an example of a user interface that may be generated for a "Devices and Printers" folder (e.g., under Control Panel\Hardware and Sound\Devices and Printers) of an operating system 108.

Each representation in the user interface 202 represents a device 110 and has a ContainderId that is unique to the computing device 104. "Right clicking" on an icon may be performed to display a menu 204 that includes a tab labeled "General" to present the device's 110 properties. The menu 204 also includes a "Hardware" tab that is selectable to present a view of the functions that are identifiable for the device 110. In an implementation, the menu 204 may also include details of the identifiable functions such as HardwareIDs, CompatibleIDs, Manufacturer, ContainderId, and so on.

The following is an example of connecting two USB flash drives having a matching hardware model into a computing device 104. Both instances result in the same DeviceModelId hash in this example and thus may be used to uniquely identify a particular device 110.

| Machine Model | ContainerID | DeviceModelId | DeviceID |
| --- | --- | --- | --- |
| HP Compaq dc7800 | {5F13E236-1778-522D-905B-6F9BCD06DF06} | 2460461214 | USB\VID_0951&PID_1607&REV_0200 |
| HP Compaq dc7800 | {5F13E236-1778-522D-905B-6F9BCD06DF06} | 2460461214 | USBSTOR\Disk KingstonDataTraveler_2.01.00 |
| HP Compaq dc7800 | {5F13E236-1778-522D-905B-6F9BCD06DF06} | 2460461214 | wpdbusenum\fs |
| HP Compaq dc7800 | {77B2AF95-458A-5BEC-A50A-A3EA4688C767} | 2460461214 | USB\VID_0951&PID_1607&REV_0200 |
| HP Compaq dc7800 | {77B2AF95-458A-5BEC-A50A-A3EA4688C767} | 2460461214 | USBSTOR\Disk KingstonDataTraveler_2.01.00 |
| HP Compaq dc7800 | {77B2AF95-458A-5BEC-A50A-A3EA4688C767} | 2460461214 | wpdbusenum\fs |

The following is an example of connecting a USB flash drive and a plug-n-play printer to the computing device 104, then connecting the same two devices to another computing device 104. The device ID 118 (e.g., DeviceModelId) persists because the same device functions are identifiable on both computing devices and thus supports unique identification of a device 110 regardless of which computing device 104 the device 110 is connected.

| Machine Model | ContainerID | DeviceModelId | DeviceID |
|---|---|---|---|
| HP Compaq dc7800 | {5F13E236-1778-522D-905B-6F9BCD06DF06} | 2460461214 | DataTraveler 2.0 |
| HP Compaq dc7800 | {E74DCA44-1DD1-11B2-831D-8F62C2138FB6} | 3279689558 | Ricoh Aficio SP C420DN PCL5c |
| PJ620AV-ABA A750E | {5F13E236-1778-522D-905B-6F9BCD06DF06} | 2460461214 | DataTraveler 2.0 |
| PJ620AV-ABA A750E | {E74DCA44-1DD1-11B2-831D-8F62C2138FB6} | 3279689558 | Ricoh Aficio SP C420DN PCL5c |

Thus, these techniques may be used to compare telemetry data from multiple sources by uniquely identifying the devices, e.g., different models of devices, from different managers, based on the device functions 120. In this way, devices may be identified that do not incorporate a unique identifier in the hardware of the device 110.

The following is an example of combining telemetry from multiple sources. In the below implementation, a function_ID on the computing device 104 may be mapped to a DeviceModelId. However, DeviceModelId A and D on the same machine are shown as an exception.

| Machine X | Machine Y |
|---|---|
| ContainerID 0: Machine DeviceModelID A | ContainerID 0: Machine DeviceModelID D |
| DeviceInstanceID 1: Function_ID 1, Driver 1 | DeviceInstanceID 9: Function_ID 2, Driver 2 |
| DeviceInstanceID 2: Function_ID 2, Driver 2 | DeviceInstanceID 10: Function_ID 7, Driver 7 |
| ContainerID 1: Peripheral DeviceModelID B | ContainerID 4: Peripheral DeviceModelID E |
| DeviceInstanceID 3: Function_ID 3, Driver 3 | DeviceInstanceID 11: Function_ID 8, Driver 8 |
| DeviceInstanceID 4: Function_ID 4, Driver 4 | DeviceInstanceID 12: Function_ID 9, Driver 9 |
| ContainerID 2: Peripheral DeviceModelID B | ContainerID 2: Peripheral DeviceModelID B |
| DeviceInstanceID 5: Function_ID 3, Driver 3 | DeviceInstanceID 13: Function_ID 3, Driver 10 |
| DeviceInstanceID 6: Function_ID 4, Driver 4 | DeviceInstanceID 14: Function_ID 4, Driver 11 |
| ContainerID 3: Peripheral DeviceModelID C | ContainerID 5: Peripheral DeviceModelID F |
| DeviceInstanceID 7: Function_ID 5, Driver 5 | DeviceInstanceID 15: Function_ID 10, Driver 12 |
| DeviceInstanceID 8: Function_ID 6, Driver 6 | DeviceInstanceID 16: Function_ID 11, Driver 5 |

As shown in bold above in the second row, Machine X and Y have the same non-removable device for Function_ID 2 in this example. Additionally, both instances have the same driver installed.

Machine X also has two Model B peripherals as shown bold in the third and fourth cells in the left column. Each has a unique Container, and different instances for the functions. The drivers installed are the same.

As shown in the fourth row in bold, Machine X and Y are both connected to the same Model B peripheral using "Container 2." However, Machine Y has a different set of drivers installed.

Lastly, as shown in the last row, although Model C and F have different devices, both use the same driver. Therefore, it is likely that the two models originated from the same independent hardware vendor (IHV) and have similar functionality. A variety of different processing techniques may be employed that leverage the techniques described herein to identify devices based on identifiable device functions, further discussion of which may be found in relation to the following figure.

Example Procedures

The following discussion describes device identification techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
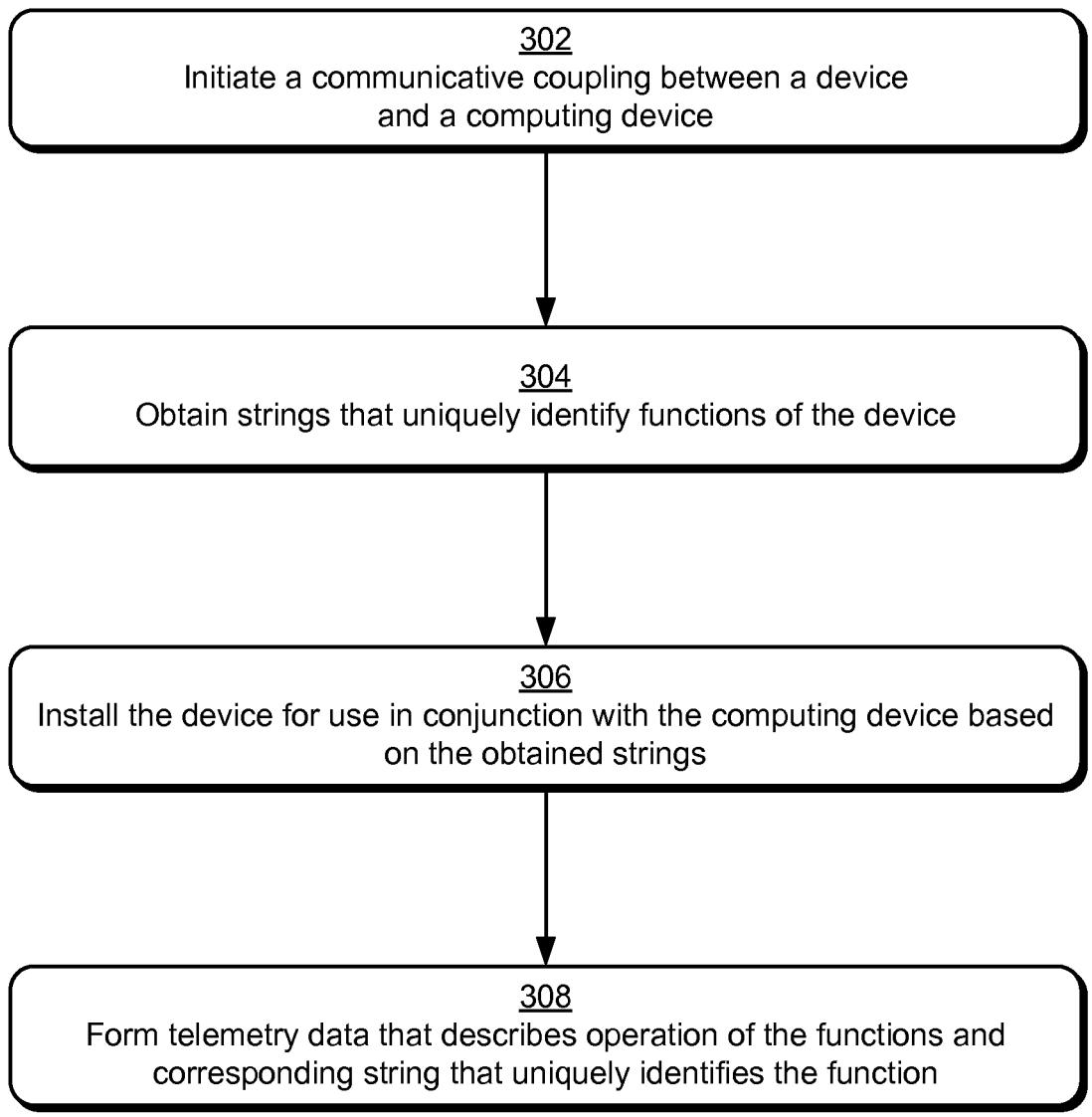
FIG. 3 is a flow diagram depicting a procedure in an example implementation in which functions of a device are identified.

FIG. 3 depicts a procedure 300 in an example implementation in which functions of a device are identified. A communicative coupling is initiated between a device and a computing device (block 302). The device 110, for instance, may be communicatively coupled to a bus of the computing device. As previously stated, the device 110 may assume a variety of configurations, such as external, internal, and so on to provide a wide variety of different functions. Additionally, the device 110 may be configured as a virtual device. In this case, the communicative coupling may refer to recognition of the virtual device by the computing device 104.

Strings are obtained that uniquely identify functions of the device (block 304). A device manager module 112, for instance, may obtain strings that are used to identify code (e.g., a driver, .inf file, and so on) that is to be used to "install" the device 110 for operation in conjunction with the computing device 104 (block 306). The code, for instance, may be available locally at the computing device 104 as part of the operating system 108, may be obtained remotely over a network 106, and so on. In this example, this identification may also be used to identify the device 110 that includes the functions as further described in relation to FIG. 4.

Telemetry data is then formed that describes operation of the functions and the corresponding string that uniquely identifies the function (block 308). The telemetry data, for instance, may describe the functions that are identifiable by the computing device 104 and how those functions operate, such as for compatibility statements, test prioritization, and so on. Thus, the identification of the functions and the additional data that relates to the functions (e.g., describes operation of the functions in conjunction with the computing device 104) may be used to support a variety of different processing as further described in relation to FIG. 5.

Figure 4:
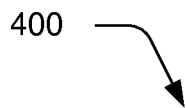
FIG. 4 is a flow diagram depicting a procedure in an example implementation in which a device identifier is formed based on device functions.

FIG. 4 depicts a procedure 400 in an example implementation in which a device identifier is formed based on device functions. Data is obtained that describes functions of a device that are identifiable for use in conjunction with a computing device (block 402). The data, for instance, may be telemetry data that is received at the service provider 102 via the network 106 from the computing device 104 as described above. In another instance, the data may be obtained locally by the computing device 104 itself, such as in an instance in which the computing device 104 computes the device ID 118 itself.

A device identifier for the device is computed based on the device functions (block 404). Each of the functions, for instance, may be identified using a string as previously described. This string may include a variety of information, such as a container ID, model ID, and so on as described above in relation to FIG. 2. A hash may then be computed of the strings such that the combination and identification of the functions may serve as a basis to identify the device. In this way, devices may be identified regardless of whether the devices include a model ID in hardware of the device.

Figure 5:
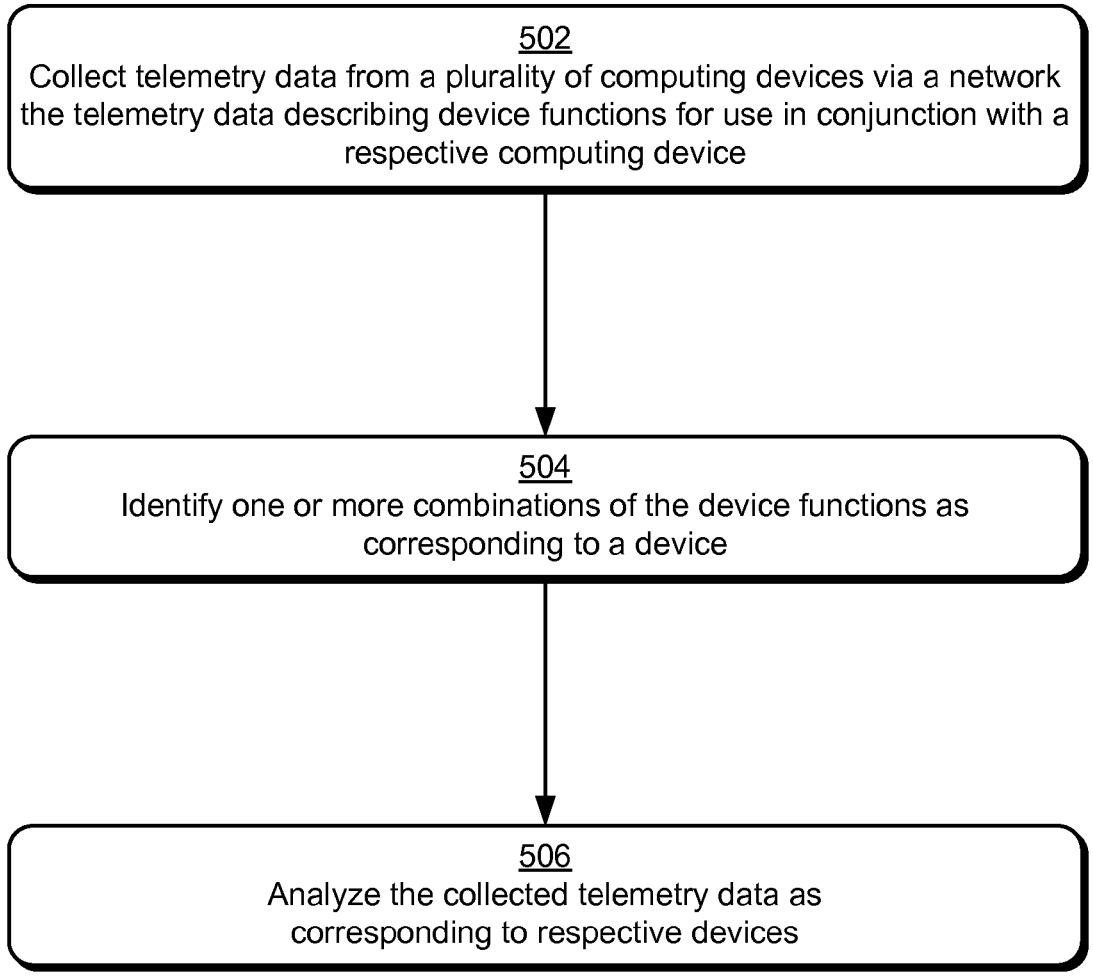
FIG. 5 is a flow diagram depicting a procedure in an example implementation in which telemetry data is collected and identification of a device using device functions is leveraged to process the telemetry data.

FIG. 5 depicts a procedure 500 in an example implementation in which telemetry data is collected and identification of a device using identifiable device functions is leveraged to process the telemetry data. Telemetry data is collected from a plurality of computing device via a network, the telemetry data describing identifiable device functions for use in conjunction with a respective computing device (block 502). The service provider 102, for instance, may collect telemetry data from a plurality of computing devices 104 via a network 106.

One or more combinations of the identifiable device functions are identified as corresponding to a device (block 504). The telemetry manager module 116, for instance, may form unique identifiers for the devices, leverage a container ID described above, and so on. Thus, the identity of the functions as well as the overall combination of the functions available may be used to identify a device 110.

The collected telemetry data is analyzed as corresponding to respective devices (block 506). As previously described a variety of different processing may be performed, such as for compatibility analysis, to compute metrics, test prioritization, customer messaging, and so on. Thus, knowledge of which devices are actually connected to be computing device 104 may be leveraged for a variety of purposes. Further, these techniques may support devices 110 that do not implement a model ID in hardware of the device 110.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
    obtaining strings used to identify code that enables operation of a device in conjunction with a computing device, the strings effective to identify functions of the device that correspond to the code, the strings that identify enabled functions being obtained, at least in part, based on use in interactions of the device with the computing device, and the strings that identify disabled functions being obtained from a service provider configured to determine the disabled functions of the device;
    forming telemetry data that describes operation of the functions and the corresponding strings that identify those functions; and
    computing a device identifier (ID) for the device based from the telemetry data based at least in part on combinations of the strings that identify the functions, the combinations of the strings being usable to determine the disabled functions that are not used in the interactions with the computing device, the computed device ID used to identify the device to the computing device in lieu of using a model ID implemented in device hardware.

2. A method as described in claim 1, wherein the device ID is usable to identify a product model of the device.

3. A method as described in claim 1, wherein the device is configured as a peripheral device, implemented using software that is executed for use in conjunction with the computing device, or is communicatively connected to the computing device via a network.

4. A method as described in claim 1, wherein the computing of the device ID includes calculating a hash value from the strings that identify the functions and are described by the telemetry data.

5. A method as described in claim 1, wherein the strings include a coding that uniquely identifies a respective said function from other said functions.

6. A method as described in claim 4, wherein the strings from which the hash value for a particular function is calculated include a hardware ID, compatible ID, a model ID, manufacturer ID, or container ID.

7. A method as described in claim 1, wherein the device ID uniquely identifies the device based at least in part on a combination of the functions that are used to form the telemetry data.

8. A method as described in claim 1, wherein the computing device implements at least part of a platform of a cloud computing system.

9. A method as described in claim 1, wherein:
    the one or more computing devices that perform the obtaining, the forming, and the computing are part of the service provider that receives the strings via a network; and
    the obtaining, the forming, and the computing are performed for strings received via the network connection from a plurality of different said computing devices.

10. A method implemented by one or more computing devices of a service provider, the method comprising:
    collecting telemetry data from a plurality of computing devices via a network, the telemetry data describing operation of enabled device functions that are used in interactions with a respective computing device of the plurality of computing devices and corresponding strings that identify those device functions, the strings that identify the enabled device functions, and that form the telemetry data, being used to identify code that enables operation of a device in conjunction with a respective computing device, the strings effective to identify the enabled device functions for both:
        peripheral devices that are located external to and connected via an external connection to a respective computing device for use by the respective computing device; and
        peripheral devices that are installed internally within the respective computing device for use by the respective computing device; and
    identifying one or more combinations of the enabled device functions as corresponding to a device, at least two said combinations that are identifiable corresponding to a single device model and at least one of the two said combinations identifiable as corresponding to a device that has at least one disabled device function.

11. A method as described in claim 10, wherein the disabled device function is not identifiable based on use in interactions of said device with the respective computing device but identifiable based on a determination of the disabled device function by the one or more computing devices of the service provider.

12. A method as described in claim 10, further comprising analyzing the collected telemetry data as corresponding to respective said devices.

13. A method as described in claim 12, wherein the analyzing includes forming product level compatibility statements, prioritizing tests, or computing popularity metrics.

14. A method as described in claim 10, wherein at least one said device is configured as an external device and another said device is configured as an internal device.

15. A method implemented by one or more computing devices of a service provider, the method comprising:
　collecting telemetry data from a plurality of computing devices via a network, the telemetry data describing enabled device functions used in interactions with a respective computing device of the plurality of computing devices;
　identifying models of devices from the collected telemetry data based at least in part on combinations of the enabled device functions, the combinations of the enabled device functions being usable to determine disabled device functions that are not used in the interactions with the respective computing device, and the enabled and disabled device functions being usable to compute a device identifier (ID) that is effective to identify the models of the devices in lieu of using respective model IDs implemented in device hardware, the computed device ID enabling identification of devices that do not implement model IDs in device hardware for providing support to those devices; and
　analyzing the collected telemetry data as corresponding to respective said devices.

16. A method as described in claim 15, wherein the analyzing includes forming product level compatibility statements, prioritizing tests, or computing popularity metrics.

17. A method as described in claim 16, wherein the identifying is performed at least in part by computing a device ID by calculating a hash value from strings that describe the identifiable device functions.

18. A method as described in claim 17, wherein the strings include a coding that uniquely identifies a respective said function from other said functions.

19. A method as described in claim 17, wherein the strings include a hardwire ID, a compatible ID, a model ID, a manufacturer ID, or a container ID.

20. A method as described in claim 15, wherein at least one said device is configured as an external device and another said device is configured as an internal device.

* * * * *